United States Patent [19]

Schauder

[11] Patent Number: 4,642,751
[45] Date of Patent: Feb. 10, 1987

[54] HIDDEN DC-LINK AC/AC CONVERTER USING BILATERAL POWER SWITCHES

[75] Inventor: Colin D. Schauder, Murrysville, Pa.

[73] Assignee: Westinghouse Electric Corp., Pittsburgh, Pa.

[21] Appl. No.: 829,739

[22] Filed: Feb. 14, 1986

[51] Int. Cl.$^4$ .............................................. H02M 5/22
[52] U.S. Cl. ...................................... 363/159; 363/34; 363/161
[58] Field of Search ................. 363/34, 159, 160, 161, 363/163, 164, 165, 10

[56] References Cited

U.S. PATENT DOCUMENTS

| | | | |
|---|---|---|---|
| 3,470,447 | 9/1969 | Gyugyi et al. | 363/160 |
| 3,493,838 | 2/1970 | Gyugyi et al. | 363/160 |
| 4,468,725 | 8/1984 | Venturini | 363/160 |

Primary Examiner—Patrick R. Salce
Assistant Examiner—Jeffrey Sterrett
Attorney, Agent, or Firm—C. M. Lorin

[57] ABSTRACT

The invention resides in providing bilateral switches between the respective phase lines of an AC input source and a common phase line of an AC output to form a phase line group of said bilateral switches on each AC output line; in fact, controlling the bilateral switches of each group so as to generate with AC input lines a DC link voltage with respect to the associated AC output line, and secondly in controlling the bilateral switches in such group to modulate such DC link voltage in relation to a desired AC voltage for such associated AC output line, each of said groups being operated with a corresponding phase shift to provide a corresponding phase shift between the respective output phase lines.

5 Claims, 11 Drawing Figures

4,642,751

HIDDEN DC-LINK AC/AC CONVERTER USING BILATERAL POWER SWITCHES

CROSS-REFERENCE TO RELATED PATENT APPLICATION

The present patent application is related to copending patent application Ser. No. 06/829,740 filed and entitled: "MATRIX CONVERTER CONTROL SYSTEM AND MOTOR DRIVE EMBODYING THE SAME".

This cross-referenced patent application is hereby incorporated by reference.

BACKGROUND OF THE INVENTION

A conventional voltage source inverter includes an AC/DC converter and a DC/AC inverter interconnected by a DC-link. This voltage-source is controlled on the inverter side to generate an AC current output of selected frequency and under selected voltage output, thereby to control an AC load in response to a predetermined constant voltage constant frequency AC power supply at the input of the AC/DC converter, while generally a six-thyristor bridge is used for AC/DC conversion and also six power switches are used mounted in a bridge to form the inverter. Control of the inverter is done in different ways, for instance using pulse-width-modulation to control the inverter switches in succession, thereby to generate AC output waves of controlled magnitude and frequency which can be used for the respective phases of an AC motor, for instance.

Another approach in the prior art to generate a multiphase variable frequency variable voltage output from a constant frequency constant-voltage AC input, is the frequency changer, more specifically the unrestricted frequency changer (UFC), as described in U.S. Pat. Nos. 3,470,447 and 3,493,838 of L. Gyugyi et al. In such case, bilateral switches are used on each phase of the AC input to connect with each phase at the AC output, while providing current flow in both directions.

The bilateral switches are preferably devices which are capable of being triggered ON at will and of being interrupted at will, by triggering to permit current flow in both directions.

The bilateral switches select segments of the supply voltage for application to the load, and in a three-phase power supply, the selection process involves sequentially reconnecting the load to the supply in such a way that a defined phase shift (60 degrees for six-pulse, 120 degrees for three-pulse) is produced by each reconnection. For each rate of progression through this sequence a different fundamental output frequency is obtained. This system can be used to produce a balanced set of controlled-frequency output voltages, of constant amplitude, which have relatively low harmonic distortion. In order to obtain conrol of the fundamental output voltage, schemes have been suggested, most of which involve reducing the load voltage to zero periodically, with controlled duty cycle. In general, six-pulse UFC's operated in this manner have been shown to be technically viable. However, using only half as many switches in a three-pulse version is tempting, but has been less acceptable.

The gist of the present invention rests upon the realization that the UFC, as just described, is essentially a controlled source of AC voltage, much like a conventional voltage-source inverter. Here too, the amplitude and frequency are controlled variables, despite the fact that modern control schemes for AC motor drives, which require power amplifiers and control of the instantaneous output voltage to effect closed-loop current control, are generally not applicable to UFC systems.

SUMMARY OF THE INVENTION

An approach is now proposed which uses the bilateral switch configuration of a three-pulse UFC, and applies to it a particular switching control scheme. This scheme will allow fast control of the mean output voltage level while retaining the inherent regenerative capability of the UFC.

In a three-pulse UFC system, three groups of three bilateral switches are associated with each of the output phase lines and within each group each bilateral switch is associated with one of the input phase lines, thereby forming a nine-switches system. Within such a group, the three switches are selected, one at a time, according to either a positive, or a negative switching pattern. Positive, or negative switching is arranged to produce at the output a phase-to-neutral DC voltage of the same polarity. The voltage magnitude can be controlled by phase shifting. With such an arrangement, it appears that each group exhibits a three-pulse envelope and behaves in fact like a three-pulse rectifier/inverter, and the voltage between lines is obtained with two such groups each having definite polarity determined by switching at firing angles which are one at zero degrees; the other at 180 degrees. Accordingly, the effect on the load at any instant is the same as under the output of a six-pulse rectifier bridge with phase control operatd at constant phase angle.

DESCRIPTION OF THE INVENTION

Figure 1:
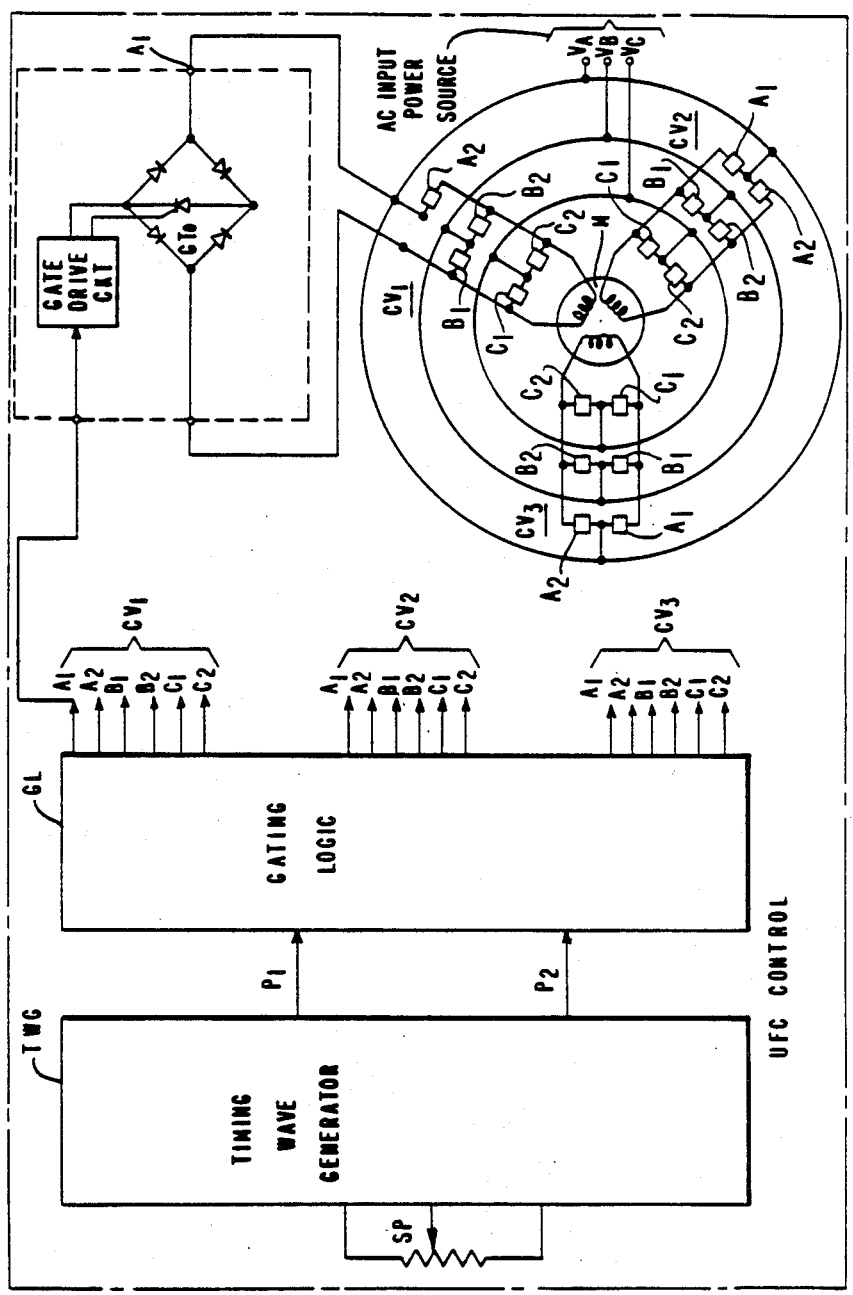
FIG. 1 shows a prior art diagram of a UFC system.

Referring to FIG. 1, an unrestricted frequency changer (UFC), such as disclosed in U.S. Pat. Nos. 3,170,447 and 3,493,838 is shown to include three converters grouping eighteen bilateral switches arranged by groups of six (A1, A2, B1, B2 and C1, C2) between two AC lines of the 3-phase AC input and two AC lines of the 3-phase AC output. As explained in the patent, pairs of bilateral switches pertaining to each such converter are controlled so as to conduct during a controlled time interval between two enveloping line-to-line voltages, successively from phase line to phase line.

Figure 2:
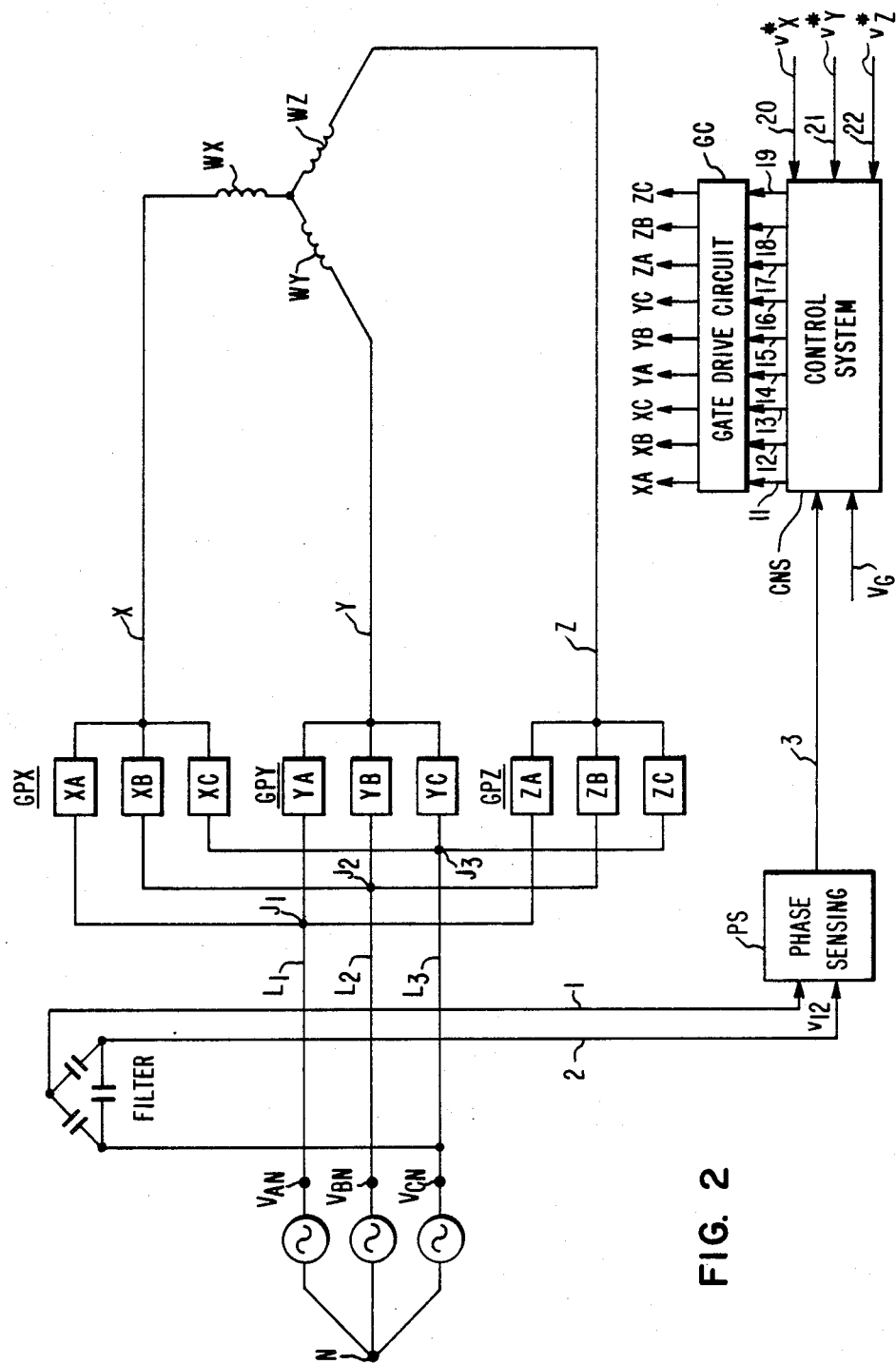
FIG. 2 is a block diagram showing the basic circuit according to the invention.

Referring to FIG. 2, three connecting groups GPX, GPY and GPZ of bilateral switches are provided between the AC sides. However, each group here includes three bilateral switches (XA, XB, XC for group GPX, etc.) instead of six in the case of FIG. 1. Moreover, each such group is establishing a connection at the input side, with one of the three input phase lines (A, B, C) as in FIG. 1, and at the output side to one of the AC phase lines (X, Y, Z), rather than being connected between phase lines as in FIG. 1.

Figure 3:
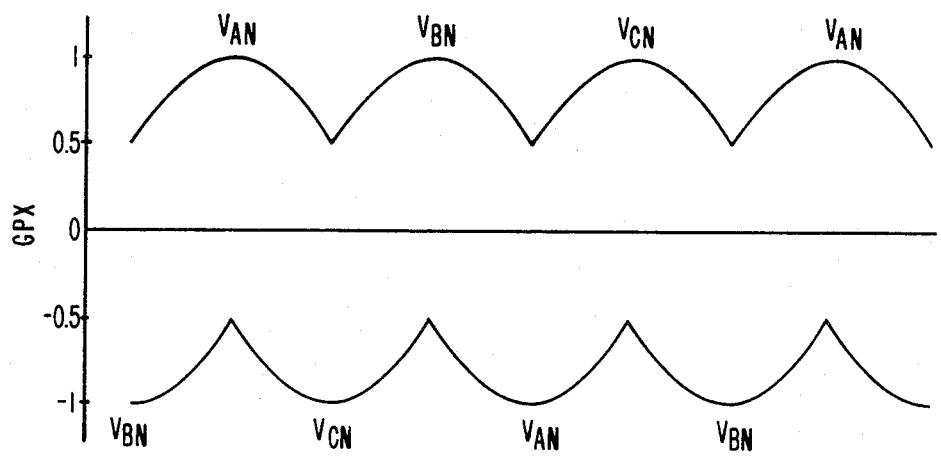
FIG. 3 illustrates with curves the generation of voltage-to-neutral of the AC input polarity waves obtained with power switches connected to an AC input power source.
Figure 4:
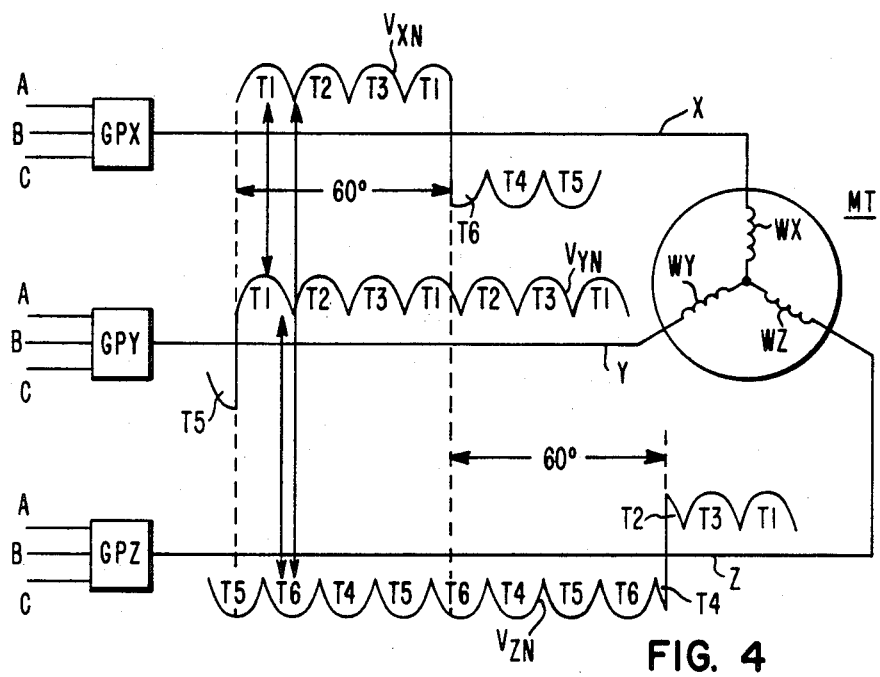
FIG. 4 shows the circuit according to the invention as it appears when controlled to provide a "hidden" DC-link based on FIG. 3.

FIGS. 3 and 4 illustrate the gist of the invention. When controlling the converter (GPX, GPY, GPZ) while the bilateral switches are mounted in a bridge across the AC input lines (L1, L2, L3 in FIG. 2) so as to conduct as in a rectifying bridge, the voltage-to-input neutral envelope of the conductive periods from one switch to another in natural commutation succession will be as shown in FIG. 3 for zero firing angle. It is a rectified voltage formed by the successive curves $V_{AN}$, $V_{BN}$ and $V_{CN}$ of positive polarity for output phase line $V_{XN}$ of FIG. 4, for instance, and of negative polarity for $V_{ZN}$ of FIG. 4, at a given time of control as represented on a per-unit basis, i.e., the voltage is 1 at the peak, and .5 at the natural commutation point NC between two voltage curves of the envelope. FIG. 4 shows the situation with a six-pulse arrangement. Initially in the example there is a positive polarity on the "hidden" DC-link derived with group GPX and with group GPY, the negative polarity being derived with group GPZ. Then, after a 60° duration, the polarity on line X is reversed and a negative polarity is derived with group GPX and GPZ. the positive polarity being derived with group GPY, for another 60°, and so on. As seen in FIG. 4, which is an illustration of an AC motor drive application, between windings WX and WY the line-to-line voltage is zero, whereas, on a per-unit basis for the two other pairs, the voltage varies between 2 and 1 line-to-line. However, the "hidden" DC-link voltage is here considered on a line-to-input neutral bais. With this understanding, the arrangement of FIG. 2 may be considered as a converter which, when properly fired, will operate as an AC/DC converter. FIG. 2 shows a control system CNS for controlling by lines 11 the gating circuit GC for the nine bilateral switches XA to ZC. Between two input phase lines $L_1$, $L_2$, from lines 1 and 2 is sensed the line-to-line voltage $v_{12}$ applied by line 3 as an electrical angle reference to the control system. Reference signals $v_X^*$, $v_Y^*$, $v_Z^*$ characterizing the motor currents $i_x$, $i_y$, $i_z$ are applied on lines 20, 21 and 22 to the control system. Another reference signal for the overall group voltage demand VG is applied on line 3′ to the control system. When using pulse-width-modulation as illustrated hereinafter, such group voltage demand reference signal is set to maximum voltage.

If the "hidden DC-link" is used as such for generating AC current on the three-line output system, for instance by pulse-width-modulation, the voltage source inverter function becomes available like in a standard VSI system. It also appears from FIG. 3, that while the envelope or ripple voltage $V_{AN}$, $V_{BN}$, $V_{CN}$ ... goes from one natural commutation point NC to another, a delaying angle α for firing from each of such points will provide a phase-to-neutral voltage on output phase lines X, Y, Z of smaller magnitude. The invention will be described for the sake of simplicity in the case where such delaying angle is zero, like on FIG. 3, and where the average DC voltage is shown in dotted line.

Figure 5:
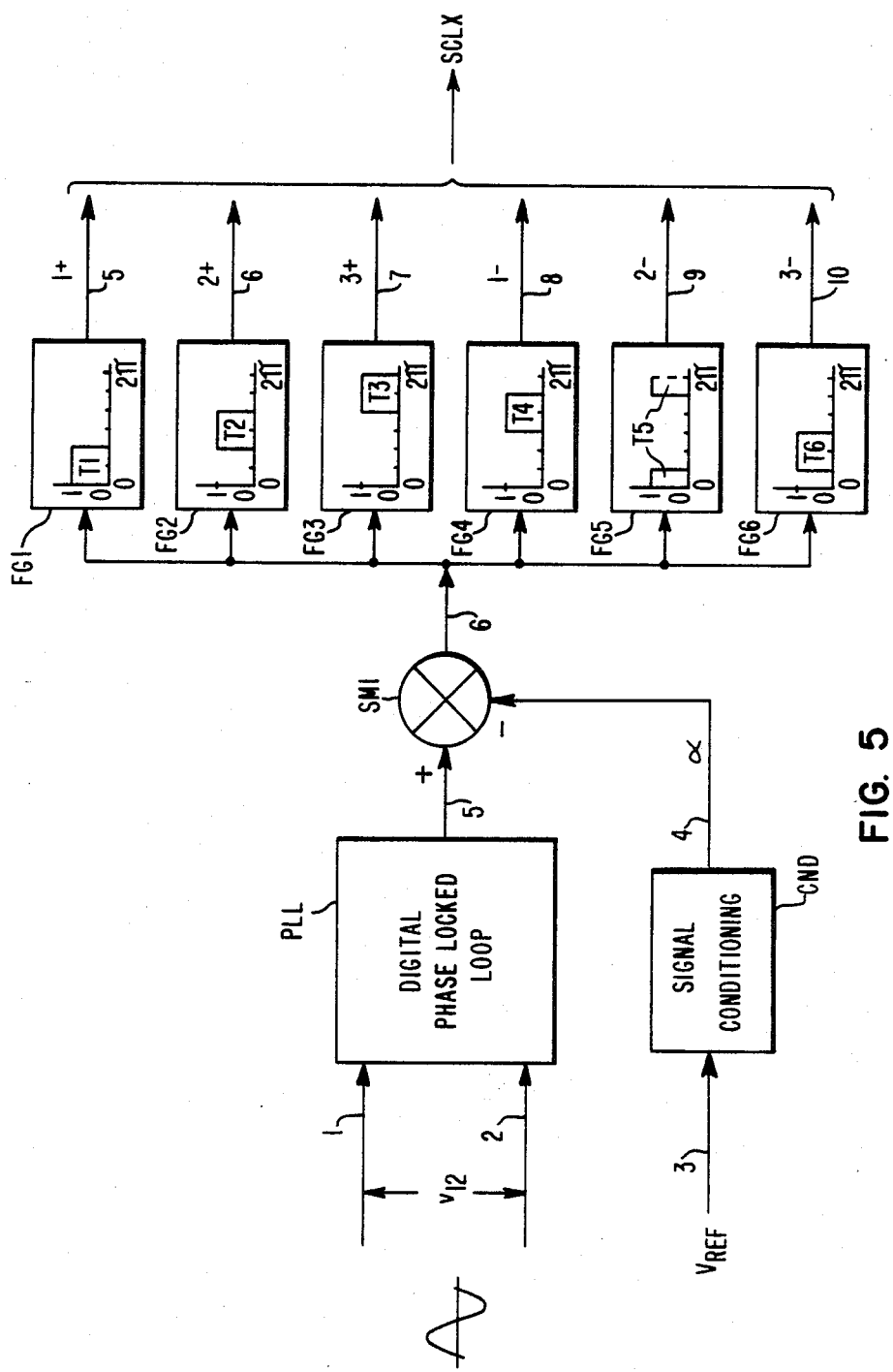
FIG. 5 is a schematic representation of a circuit used to generate with existence functions DC-link voltages according to FIG. 4.

Referring to FIG. 5, six-function generators FG1, FG2 ... FG6 are shown which define in electrical angles each time intervals T1, T2, ... T6 and a polarity (positive for FG1, FG2, FG3; negative for FG4, FG5 and FG6) during which the hidden DC link voltage VXN, VYN and VZN is applied as derived with the hidden rectifier function and with a corresponding polarity as characterized by the corresponding existence function. FIG. 4 considered in relation to FIGS. 3 and 5 shows how the time intervals (T1-T6) defining the polarity are distributed among the arches of the ripple for each polarity and between the three phase lines X, Y, Z.

Figure 6:
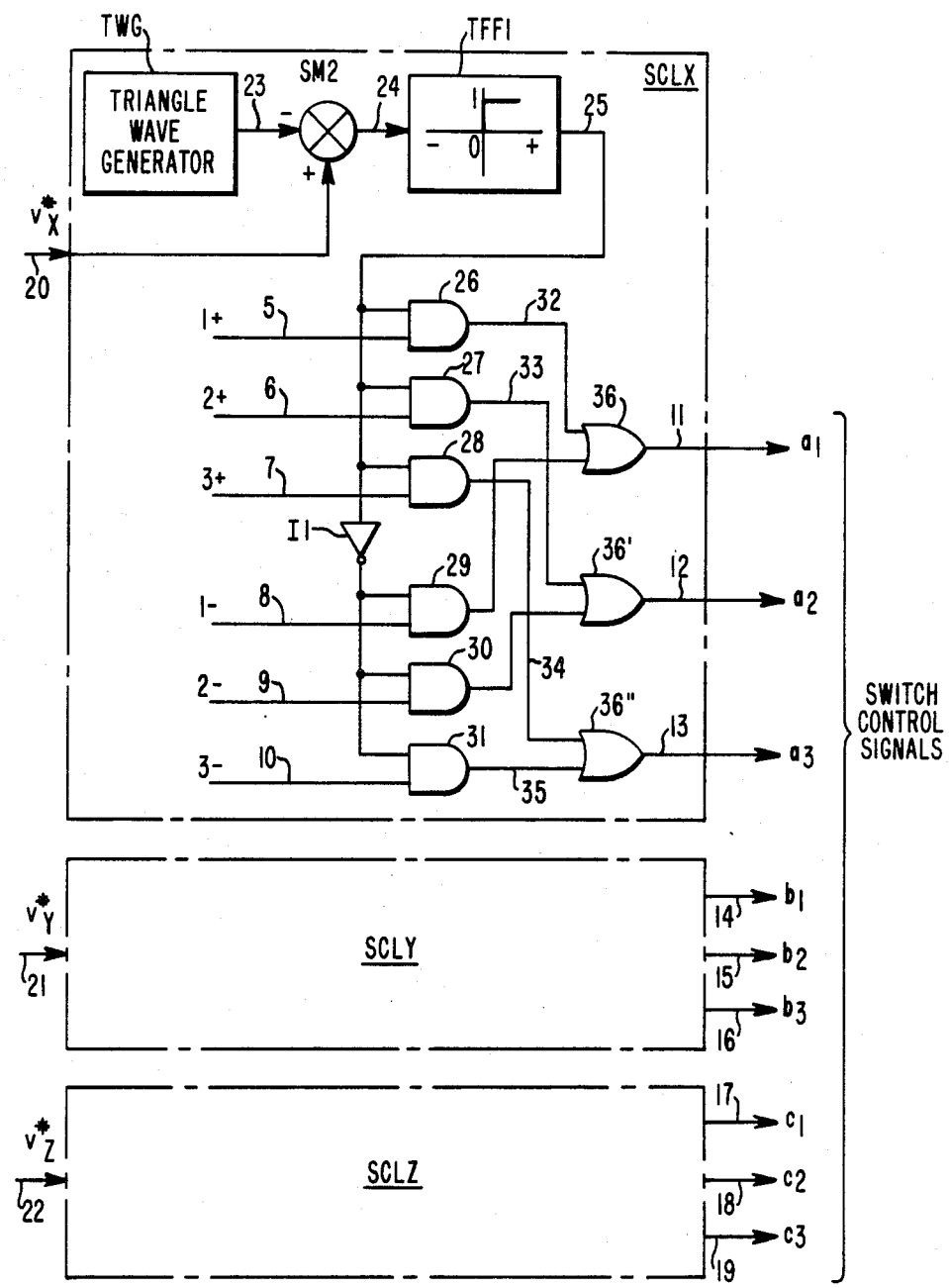
FIG. 6 shows the switch control logic used for pulse-width modulating the DC-link voltage generated in accordance with FIG. 5.

FIG. 6 shows how pulse-width-modulation can be applied to such hidden DC-link voltages VXN, VYN, VZN so as to generate an AC current and an AC voltage as desired in frequency and amplitude for lines X, Y and Z at the AC output. The invention is applicable to a motor drive. Accordingly, like in FIG. 1, FIGS. 2 and 4 show the three lines X, Y, Z connected to the respective windings WX, WY, WZ of the induction motor MT.

Figure 7:
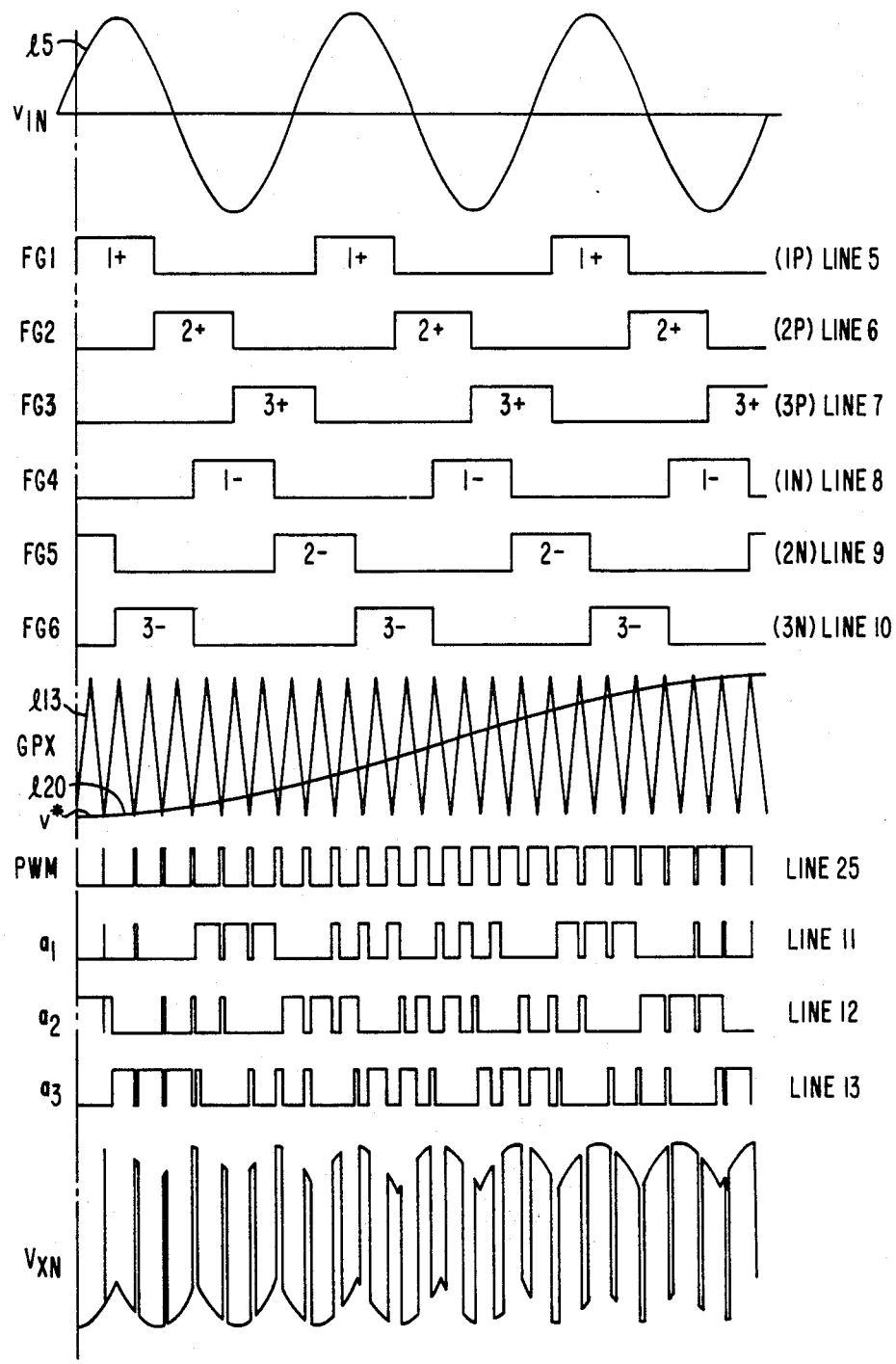
FIG. 7 illustrates with curves the operation of the circuits of FIGS. 5 and 6.

Stated another way, the system comprises 9 bilateral switches XA-XC, YA-YC, ZA-ZC distributed among three like groups GPX, GPY, GPZ. Within a group, the three switches (XA, XB, XC) are selected in response to a corresponding one of the existence functions from function generators FG1-FG6, one at a time, according to either a positive, or a negative polarity according to the switching pattern. At any time, each group is chosen to be either a positive, or a negative group as shown in FIG. 7 for the various existence functions FG1-FG6, and as the switching pattern prescribes for such group. Both positive and negative switching patterns are synchronized, i.e. phaselocked (PLL on FIG. 5) to the main supply (by reference to the line-to-line voltage V12 for instace, FIG. 5). The positive group switching is arranged so that the group will produce a definite mean positive output voltage relative to neutral. Similarly, the negative group switching is arranged to produce an equal and opposite mean negative voltage. The level of the group output voltage (positive, or negative) can be adjusted by phase-shifting the switching patterns applied to the voltage of the main supply (lines L1, L2, L3). Such voltage level is determined by the controller according to the required mode of operation. The choice of a group as positive, or negative, can be changed at any time, subject only to practical switching limitations. With such arrangement, therefore, the line-to-line output voltages will either be zero (VXN–VYN in FIG. 4) or have a mean value equal to plus, or minus, twice the group voltage set by the controller (VXN-VZN, or VYN-VZN in FIG. 4). Although each group acts as a threepulse rectifier/inverter, the voltage between lines is, in fact, constituted by two such groups operated with 180° phase-shifted switching patterns. The output line-to-line voltage, thus, amounts at any instant to the output of a six-pulse converter with phase control operated at constant firing angle.

Accordingly, the invention provides first for positive and negative patterns applied on the respective groups GPX, GPY and GPZ. This can be accomplished in different ways, which all require sensing one phase of the voltage of the three-phase lines (L1, L2, L3) supply, and its zero-crossings. A preferred approach is illustrated by FIG. 5. A phase-locked loop PLL, synchronized with the line-to-line voltage $V_{12}$ sensed between phase lines L1 and L2 and derived from lines 1 and 2, is locked to the supply line voltage and provides on line 5 a signal representing the electrical angles counted from the instant when V12 is at 60°. This is generally known. If necessary, a delay angle may be added by line 4 as a subtrahend to line 5 via a subtractor SM1. The delay angle is defined by a reference signal $V_{ref}$ on line 3' to a signal conditioning circuit CND providing on line 4 a delay angle $\alpha$. For the purpose of illustration, it is here assumed that $\alpha=0$. Therefore, the signal of line 6 matches the signal of line 5. Line 6 goes to six function generators FG1–FG6, providing on respective lines 5–10 signals which each define ⅓ of 360°, or a range of 120°. Accordingly, on line 5 is outputted by circuit PLL a signal indicating the absolute phase of the input AC power supply in a range from zero to $2\pi$ radians, zero radian corresponding to the instant when v12 is at 60°. Ignoring the signal of line 4 under the assumption that the delay angle $\alpha$ is zero, as the case is for operation in the pulse width modulation mode, on line 6 each of function generators GP1–GP6 receives as one coordinate the running amount of radians on the reference AC wave.

Thus, FG1 provides on line 55 a ONE for a first range of 120° with the assigned positive polarity. FG2 outputs on line 56 a signal having a ONE defining a second range of 120° also with positive polarity assigned. FIG. 3 generates on line 57 a ONE for the third range of 120° and for the same positive polarity. In the same fashion, function generators FG4, FG5 and FG6 provide three separate ranges of 120 electrical degrees for the negative polarity with, however, a phase shift, relative to those of the positive polarity, by 180°. The outputs of FG4, FG5 and FG6 are on respective lines 58, 59 and 60.

FIG. 6 shows how the signals of lines 55 to 60 are applied to three switch control logic circuits SCLX, SCLY and SCLZ which relate to the respective groups GPX, GPY and GPZ. FIG. 5 shows how DC links are generated to which, as shown by FIG. 6, pulse-width modulation is applied to effect the function of a DC-link inverter in a voltage-source inverter system on a line-per-line basis, i.e. on phase lines X, Y and Z.

Considering, for instance, the switch control logic SCLX associated with the three bilateral switches XA, XB, XC of group GPX, a reference sine wave $v_X^*$ is applied by line 20 as a reference time wave for intersection in the pulse-width-modulation process by a triangular wave generated on line 23 by a timing wave generator TWG. Comparator CMP responds to lines 20 and 23 and provides on line 24 an error signal which is applied to a transfer function generator TFF1 providing on line 25 a logic signal which is a ONE, or a ZERO, and of duration in accordance with the width of the intersection between the sine wave $v_X^*$ and the triangular wave applied at a much higher frequency. The frequency and amplitude of the reference sine wave $v_X^*$ is, as generally known, defining the frequency and magnitude of the outputted voltage wave resulting from the PWM modulation process.

Referring to FIG. 6, the signals of lines 55–60 are applied to AND devices 26–31, respectively, which also receive from line 25 the pulse-modulated signal. The error signal of line 24 is converted to a zero or a ONE by the transfer function TFF1 depending on the sign of the error. The outputted logic signal, which is characteristic of the pulse-modulated signal, is applied as is to NAND devices 26–28, and in inverted form to NAND devices 29–31. The six DC-link voltages of lines 32–35 are applied by pairs, so as to correspond to switch XA, XB, or XC, via an OR device (36, 36', 36'') outputting on lines 11, 12 and 13, the respective signals a1, a2, a3 expressing the control states for conduction and non-conduction as time intervals for bilateral switches, XA, XB, XC, thereby to determine the AC voltage for line X. The same can be said for switch control selectors SCLY and SCLZ, which have a reference signal $v_Y^*$, or $v_Z^*$, each with a 120° phase shift relative to one another like between lines at the AC output. Accordingly, for SCLY, lines 14, 15 and 16 are outputting signals $b_1$, $b_2$, $b_3$ which, in group $\overline{GPY}$ through the corresponding gating circuits of YA, $\overline{YB}$, YC, establish the conduction and non-conduction time intervals of the switches. Similarly, SCLZ outputs on lines 17, 18, 19 corresponding control signals c1, c2, c3 for bilateral switches ZA, ZB, ZC of group GPZ.

Referring to FIG. 7, the reference voltage curve of line 4 is shown with a zero delay angle $\alpha$, thereby to develop the maximum positive and negative DC-link voltages illustrated in FIGS. 3 and 4. Further down, FIG. 7 shows the signals outputted by function generators FG1–FG6. Immediately below is illustrated the pulse-width modulation process by the triangular wave of line 23, in FIG. 6, intersecting the reference wave $v_X^*$ of line 20. The curves shown below next to it are the pulse-width modified pulses resulting from such intersections.

Curves a1, a2, a3 of lines 11, 12, 13 illustrate the control signals applied to bilateral switches XA, XB, XC, and controlled for providing conduction thereof according to the preceding pulse width characteristic. The last curve of FIG. 7 shows the resulting line-to-input neutral voltage of line X as modified by group GPX. Similar curves are easily provided for groups GPY and GPZ.

Figure 8A:
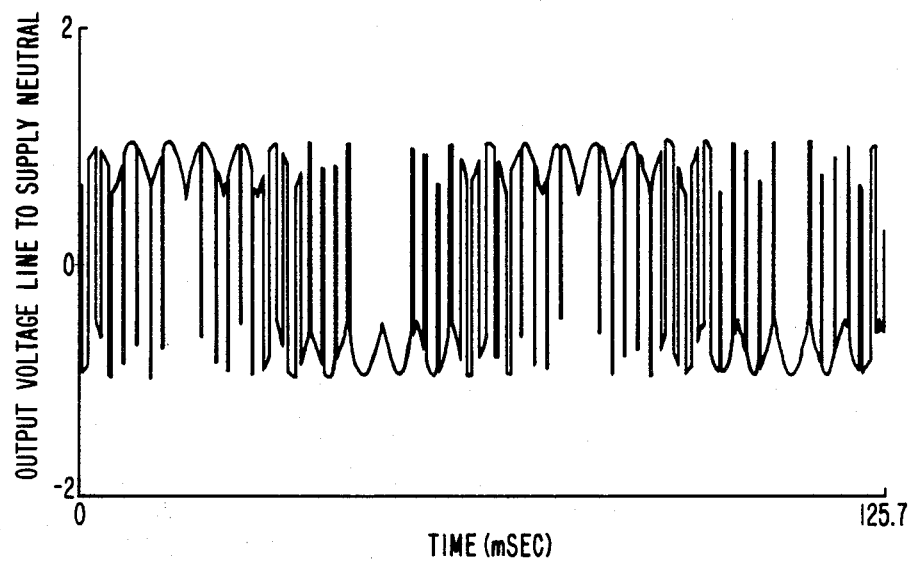
FIG. 8A illustrates for one group of switches an actual pulse-width-modulated DC-link voltage derived relative to the input neutral.
Figure 8B:
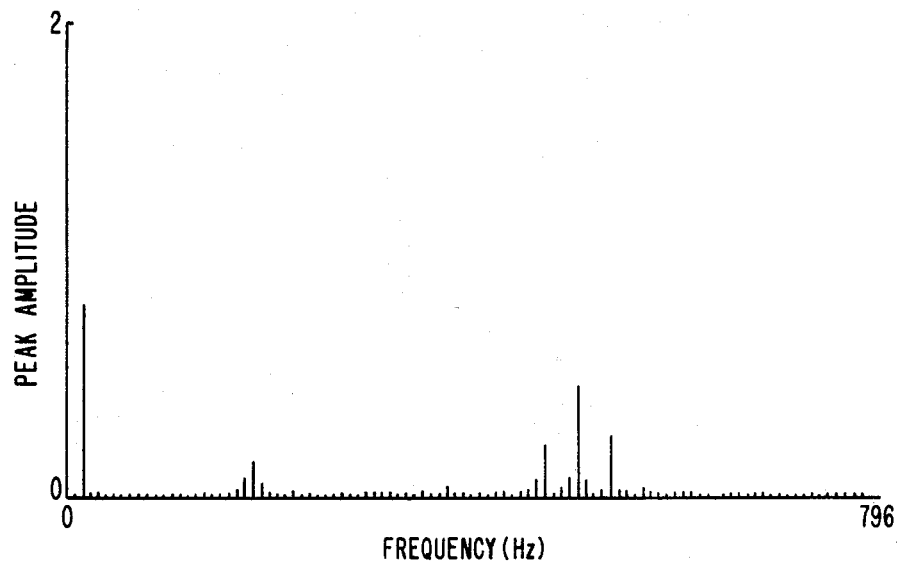
FIG. 8B is its frequency spectrum.
Figure 9A:
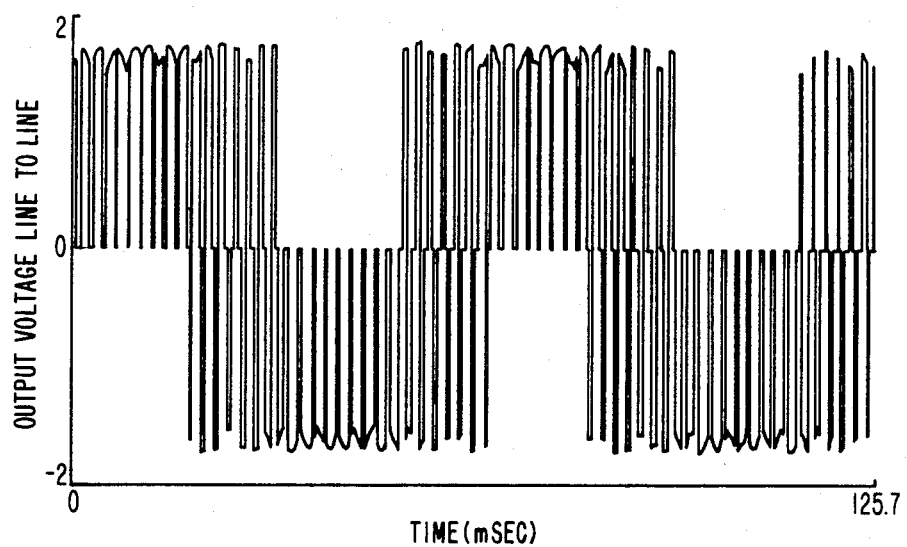
FIG. 9A is the resulting line-to-line voltage corresponding to the voltage generation according to FIG. 8A.
Figure 9B:
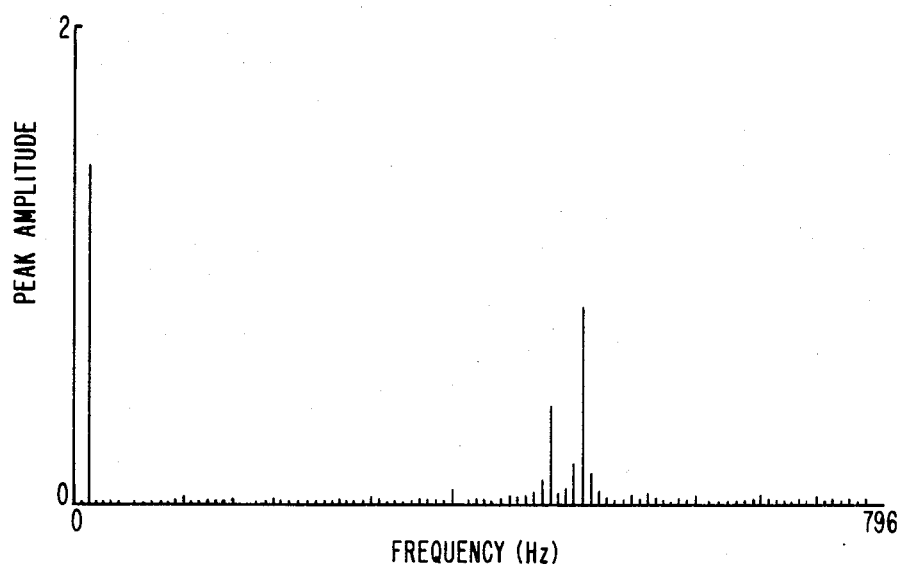
FIG. 9B is its frequency spectrum.

FIG. 8A shows an actual line-to-neutral output voltage obtained with a triangular wave at 500 Hz, input AC lines at 60 Hz and an outputted AC voltage of maximum magnitude, the frequency being 16 Hz. FIG. 8B shows the frequency spectrum of the outputted wave. FIG. 9A is like FIG. 8A for the line-to-line output voltage, and FIG. 9B shows the frequency spectrum thereof.

It appears from the preceding that the system which has been described can constitute a dual to any of the well-known DC link voltage source inverter systems. In particular, the following two modes of operation have been chosen:

(a) Six-step or Quasi-square wave

Each group is assigned to be alternately positive and negative for equal periods of time with a frequency equal to the desired fundamental output frequency. The amplitude of the fundamental output voltage is controlled directly via the group output voltage control. In this mode, voltage and frequency are still the controlled variables.

(b) Pulse-width modulation

Each group is treated as a switching amplifier. The group voltage is set to the maximum value (phase delay angle $\alpha=0$). The group polarity is then chosen according to some PWM algorithm which controls the duty cycle of the switching process between positive and negative so as to achieve the mean output voltage corresponding to a voltage demand signal. One can use switching at constant frequency, or pre-programmed switching sequences. It is also possible to effect switching in response to detected current error signals. The preferred embodiment chosen for illustration in FIG. 6 compares a voltage reference $v_X^*$, $v_Y^*$ or $v_Z^*$ with a triangle wave (line 23 from TWG) and uses the polarity of the detected difference to set with a transfer function TEN the group polarity. A particular logic (AND devices 26–31 and OR devices 36, 36', 36'') has been shown which generates the switching control signals $a_1$, $a_2$, $a_3$ on lines 11–13, $b_1$, $b_2$, $b_3$ on lines 14–16 and $c_1$, $c_2$, $c_3$ on lines 17–19 using the output voltage references ($v_X^*$, $v_Y^*$, and $v_Z^*$) and the logic signals (lines 59-6) derived with the phase function generators and the mains phasing sensing system.

The group voltage produced by each of the switch groups has a ripple component at three times the input frequency. In a three-phase system, this is not a serious problem. However, the effect of the ripple component on the output voltage can be almost eliminated by offsetting to the triangle waves in order to compensate for the swings in the peak envelope. These measures are advisable, provided the PWM switching frequency is high enough for high quality output voltage control.

Like with the conventional UFC systems, switching within the groups must be carefully synchronized to prevent both mains short circuits and overvoltages due to current interruption.

The system according to the invention is inherently regenerative and it can be used to achieve high bandwidth current control. Therefore, a motor drive using the present invention has the capability of a high performance AC drive system.

It is understood that any interruptible device existing on the market can be used as a bilateral switch: GTO device, transistor, etc.

I claim:

1. An AC/AC converter connected between AC input lines and AC output lines comprising a plurality of bilateral power switches connected in groups associated with the respective AC output lines, the bilateral power switches in each group being associated with the respective AC input lines, whereby each bilateral power switch is connected between one AC input line and one AC output line, first means being provided for controlling the bilateral switches of each group to generate on each associated AC output line a DC voltage, and second means being provided for controlling the conduction of said bilateral switches to modulate the DC voltage between two consecutive groups to generate an AC voltage between the corresponding AC output lines.

2. The converter of claim 2 with said second means providing pulse-width modulation of the corresponding DC link voltage.

3. The converter of claim 1 with said second means being responsive to a voltage and frequency reference signal, thereby to determine the outputted AC frequency.

4. The converter of claim 1 with said first means being responsive to a voltage reference signal, thereby to determine the outputted Ac voltage.

5. The converter of claim 4 with said voltage reference signal being effective to cause a firing angle delay as applied to said bilateral switches.

* * * * *